(12) United States Patent
Balzer et al.

(10) Patent No.: US 10,455,087 B2
(45) Date of Patent: Oct. 22, 2019

(54) INFORMATION RETRIEVAL USING NATURAL LANGUAGE DIALOGUE

(71) Applicant: Microsoft Technology Licensing, LLC, Redmond, WA (US)

(72) Inventors: Andreas Balzer, Dublin (IE); David Mowatt, Dublin (IE); Alan Noel Mulhall, Dublin (IE); Muiris Woulfe, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 15/624,698

(22) Filed: Jun. 15, 2017

(65) Prior Publication Data

US 2018/0367668 A1   Dec. 20, 2018

(51) Int. Cl.
*G10L 15/00*   (2013.01)
*H04M 3/493*   (2006.01)
(Continued)

(52) U.S. Cl.
CPC .......... *H04M 3/4936* (2013.01); *G06F 16/30* (2019.01); *G10L 15/265* (2013.01);
(Continued)

(58) Field of Classification Search
CPC ... H04N 5/44543; G10L 15/063; G10L 15/22; G06F 17/2785
(Continued)

(56) References Cited

U.S. PATENT DOCUMENTS

| 6,415,257 B1* | 7/2002 | Junqua | H04N 5/44543 |
| | | | 348/E5.105 |
| 2006/0129396 A1* | 6/2006 | Ju | G10L 15/063 |
| | | | 704/243 |

(Continued)

FOREIGN PATENT DOCUMENTS

EP   2085963 A1   8/2009

OTHER PUBLICATIONS

"Meet Alfie", http://web.archive.org/web/20160617003632/http://www.alfiefetch.com/, Published on: Jun. 17, 2016, 8 pages.
(Continued)

*Primary Examiner* — Huyen X Vo

(57) ABSTRACT

Methods and systems which perform information retrieval using natural language dialog for navigating an inventory of items are described. One example provides an information retrieval system to a user using natural language dialog. The system comprises a user input receiving device, an output device, a database comprising an inventory of items, and a processor. The processor is configured to retrieve one or more items from the inventory of items using an iterative process by: in response to receiving from the user input receiving device a user input, identifying a subset of the inventory based on the user input. The processor is configured to automatically process the subset of items to determine a classification for distinguishing between items of the subset, to generate an enquiry for a user using the classification and to transmit the enquiry to the output device. The user input and/or the enquiry may use natural language.

20 Claims, 12 Drawing Sheets

(51) Int. Cl.
*G10L 15/26* (2006.01)
*G06F 16/30* (2019.01)
*G06Q 30/06* (2012.01)
*G10L 15/22* (2006.01)

(52) U.S. Cl.
CPC .......... *G06Q 30/0603* (2013.01); *G10L 15/22* (2013.01); *H04M 2201/40* (2013.01)

(58) Field of Classification Search
USPC ................ 704/1–10, 230–257, 270–277
See application file for complete search history.

(56) References Cited

U.S. PATENT DOCUMENTS

| 2006/0143007 | A1* | 6/2006 | Koh ................ G10L 15/22 704/243 |
| 2015/0379989 | A1 | 12/2015 | Balasubramanian et al. |
| 2016/0140090 | A1 | 5/2016 | Dale et al. |
| 2018/0218080 | A1* | 8/2018 | Krishnamurthy ... G06F 17/2785 |

OTHER PUBLICATIONS

Keely, "Shopping made easier (and cheaper) with Alfie", http://www.lollygagblog.com/2016/10/shopping-made-easier-and-cheaper-with-alfie.html, Published on: Oct. 28, 2016, 4 pages.

Fleisher, Chris, "Lawrenceville tech startup's app lets fingers do the resting", http://triblive.com/business/headlines/10058972-74/conversant-app-maury, Published on: Mar. 7, 2016, 3 pages.

"Google introduces Amazon Alexa-like voice-based shopping with Google Home", http://www.digit.in/general/google-introducing-amazon-alexa-like-voice-based-shopping-with-google-home-33796.html, Published on: Feb. 17, 2017, 10 pages.

Erickson, Jim, "Taobao's Mobile Shopping App is Getting Voice-Recognition Technology", http://www2.alizila.com/taobaos-mobile-shopping-app-getting-voice-recognition-technology, Published on: Nov. 27, 2013, 2 pages.

Sokolovska, Angela, "From E-Commerce to Conversational Commerce: Chatbots and Virtual Assistants", http://www.guided-selling.org/from-e-commerce-to-conversational-commerce/, Published on: Aug. 16, 2016, 13 pages.

Suvorov, Ivan, "Shopping in messengers: May 2016", https://chatbotsmagazine.com/shopping-in-messengers-may-2016-c4d28841a817, Published on: May 12, 2016, 15 pages.

"International Search Report and Written Opinion Issued in PCT Application No. PCT/US2018/033575", dated Aug. 7, 2018, 12 Pages.

* cited by examiner

1102

| Spoken phrases | Direction | Classification |
|---|---|---|
| Bigger | > | Size |
| Smaller | < | Size |
| Larger | > | Size |
| Thinner | < | Depth |
| Lighter | < | Weight |
| Quieter | < | Noise Level |
| Cheaper | < | Price |
| More cost effective | < | Price per usage |
| More awesome | > | Star rating |

FIG. 10 ative description considered in
INFORMATION RETRIEVAL USING NATURAL LANGUAGE DIALOGUE

BACKGROUND

Today's voice and chat services allow users to navigate through a menu of options to perform a task such as enquiring about an airline flight status. There are also automated telephone based shops and support lines for all sorts of products and services which use menu structures to direct customers to information, products and services they require. However, the menu systems are typically of fixed structure and require the user to know the name of the item they seek or otherwise navigate large lists of items to find the item they want. The static design of the menu is the same for all users, and it is likely that many users have to sit through listening to a large number of irrelevant options before getting to the one that interests them. They may also find it impossible to go back if they change their mind after making a selection. In the shopping experience, countless products typically need to be browsed before finding a product of interest because the system is not inherently clever to identify what the customers are looking for.

As such, these menus are only suitable for small sized inventories of products or services or small libraries of information. Furthermore, the construction of these menus requires manual input to enumerate much of what a user can ask for in order to select a specific option in the menu or be recognized in freely spoken natural language.

The embodiments described below are not limited to implementations that solve any or all of the disadvantages of these known techniques.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

The description relates to information retrieval using natural language dialogue for navigating an inventory of items. One example provides an information retrieval system to a user using natural language dialogue. The system comprises a user input receiving device, an output device, a database comprising an inventory of items (which may, in various examples, be a dynamic inventory of items), and a processor. The processor is configured to retrieve one or more items from the inventory of items using an iterative process by: in response to receiving from the user input receiving device a user input, identifying a subset of the inventory based on the user input. The processor is configured to automatically process the subset of items to determine a classification for distinguishing between items of the subset, to generate an enquiry for a user using the classification and to transmit the enquiry to the output device. Either or both of the user input and the enquiry may use natural language.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 10 is a table of relation operators for interpreting natural language user input;

Like reference numerals are used to designate like parts in the accompanying drawings.

DETAILED DESCRIPTION

Figure 1:
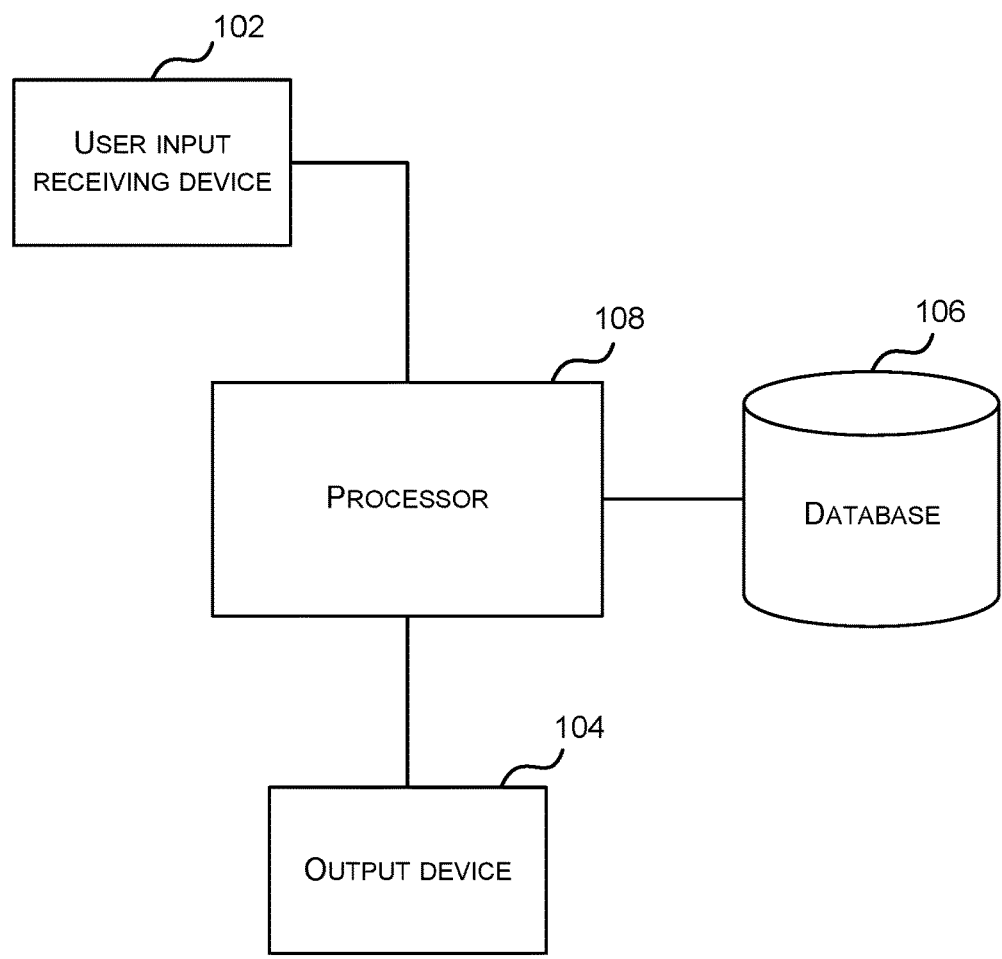
FIG. 1 is a block diagram of a system for implementing the disclosure.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The present disclosure presents a computing device, method and device that perform information retrieval using a natural language dialogue. The methods described enable navigation of an inventory of items and in particular, navigation of a large inventory of items that can change over time (i.e. an inventory that is not static). As described in more detail below, the method described herein retrieves one or more items from the inventory of items using an iterative process. In response to receiving from the user input receiving device a user input comprising one or more words, a subset of the inventory is identified automatically (i.e. without further user input) based on the received user input. The method automatically processes the subset of items to determine a classification for distinguishing between items of the subset, generates an enquiry for a user using the classification and transmits the enquiry to the output device. The enquiry may reference a plurality of different values, classes or range values of the classification and either or both of the enquiry and the user input may use natural language.

The methods described herein provide an efficient and accurate way of navigating a collection (referred to herein as an inventory) of items and in particular a large collection of items that can change over time. Using the methods described herein, a particular item within the inventory can be identified quickly. The efficiency of the information retrieval may, in various examples, increase over time as the system learns to adapt to user needs. As will be clear from the examples described below, the information retrieval methods described herein are structured in a more user-friendly manner than existing systems.

It may be useful to navigate a large inventory of items in a range of scenarios. For example, large catalogues of items for sale may benefit from an efficient method of identifying items of interest. This may save the customer time and be more likely to lead to a sale. The disclosure is not limited to items for sale, but may also be used for items being displayed for information purposes, for example in a museum or library for interactive object descriptions. The techniques may also be used to enable a user to navigate TV listings by asking questions about program information, for example asking for comedy shows that the user might like or similar questions where the user cannot articulate upfront exactly what the selection criteria are. The techniques described herein are also applicable to virtual objects for sale or free download such as applications for mobile or other computer devices, and the techniques described herein are also applicable to enterprise search (i.e. search systems within an enterprise or organisation), for example involving data retrieval of pharmaceutical trial records in a proprietary database.

Figure 11:
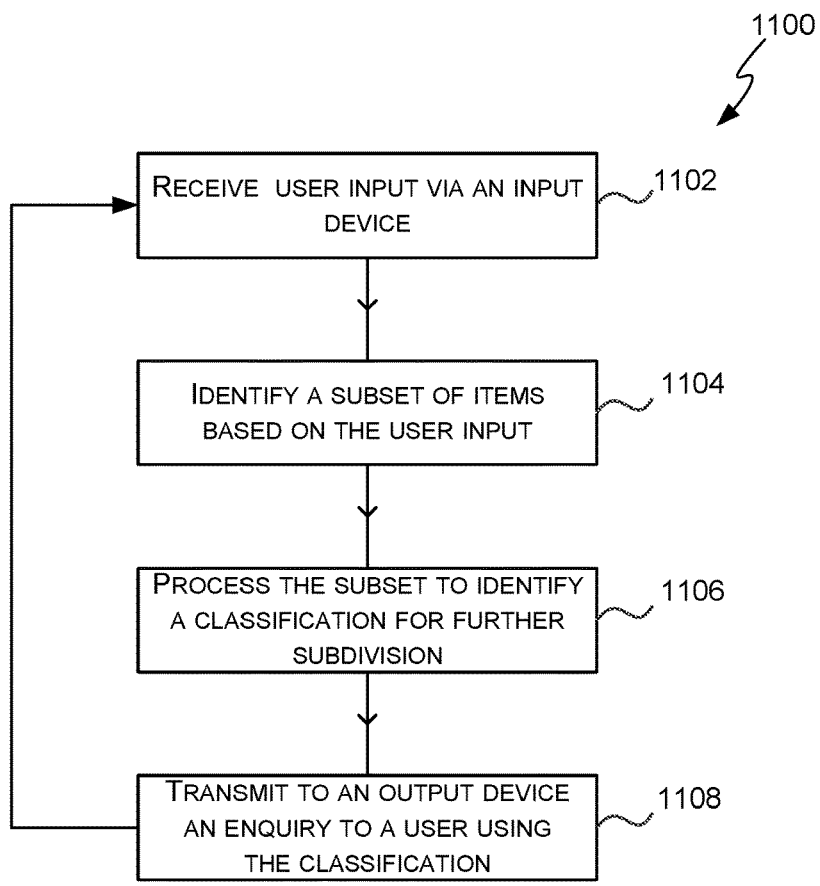
FIG. 11 is a flow chart of a method of information retrieval using natural language dialogue.

FIG. 11 shows a method 1100 of information retrieval, which may be used to determine an item of interest to a user using natural language dialogue. Referring to FIG. 11, the method 1100 comprises receiving from a user input receiving device a user input comprising one or more words (block 1102); identifying a subset of an inventory of items based on the user input (block 1104); processing the subset of items to determine a classification for distinguishing between items of the subset (block 1106); and generating and transmitting to an output device an enquiry to the user using the classification (block 1108). The enquiry may, for example, provide the user with two or more options (e.g. four options) with each option representing a different value, value range or class of the classification. As described below, the user input and/or the output enquiry may comprise natural language.

Whilst FIG. 11 shows that the processing of the subset (in block 1106) occurs after the identification of the subset (in block 1104) and in response to the receipt of the user input (in block 1102), in various examples, some subsets of items in the inventory may be pre-processed (i.e. processed in advance) to determine a suitable classification for distinguishing between items of the subset for use in the event that the particular subset is selected (in block 1104) in response to receipt of a user input (in block 1102).

The method of FIG. 11 is described below with reference to various example scenarios. The method is not limited to any of the scenarios described and may be used with any inventory of items. The inventory may, in various examples, be large (e.g. it may contain many hundreds of items) and in various examples, the contents of the inventory may can change over time. Any aspects which are described below with reference to a particular scenario may also be applied more generally (e.g. to any inventory of items).

In an example implementation, a user may be interested in finding a camera in a large catalogue of hardware items for sale. To start the process, the user provides an input comprising at least one word, such as 'camera', to indicate to the system their intent. The user input may be in the form of a phrase or sentence of natural language, such as 'I want to buy a camera', for example delivered as speech or text. As such, the user input may be received by a user input receiving device of the system (block 1102). The user input receiving device may, for example comprise a microphone and speech recognition computer program, or may comprise a keyboard for inputting text and a chatbot interface computer program (e.g. which can use chatbot framework). Using a word (e.g. the word 'camera' in this example scenario) extracted (or otherwise identified) from the user input, the system makes reference to the inventory of items to establish which of them may be of relevance to the user's search. For example, this may be carried out using a word search of the inventory using the extracted word (e.g. 'camera') as an input. Alternatively, items labelled as being a camera may be identified by the system using a look up table storing the inventory. This step results in a subset of the inventory being identified as being potentially of interest to the user (block 1104). In this example scenario, all items in the inventory that are cameras, optionally together with all products related to cameras, can be identified and will belong in the subset.

At this point, the system analyses the subset to find an intelligent way forward for helping the user to efficiently navigate the inventory to find a camera they like. In order to achieve this, the system processes the subset of items to identify a classification that is suitable for distinguishing between the items belonging to the subset (block 1106). For example, if the subset contains one hundred cameras, two of which are waterproof and ninety-eight of which are not waterproof, then being waterproof does not help to split the subset well because it is likely that it will only help the user to narrow the subset down to ninety-eight items. However, if the subset contains twenty-five single lens reflex (SLR) cameras, twenty-five compact cameras, thirty camera phones and twenty kids' cameras, then camera type may help the user to narrow the subset down to twenty-five, thirty or twenty items so it is a good classifier for splitting the subset. Furthermore, the user may find it easy to decide which camera type (i.e. SLR camera, compact camera, camera phone or kids' camera) they prefer, but may not care what colour the camera is. Camera type is therefore a better classification for enabling the user to select a preferred classification value than colour. Taking into account both the ability of the classification to split the subset and the ability of the classification to enable the user to select a value or range of values of the subset, it may be that camera type is a better performing classification than whether the camera is waterproof and what colour the camera is.

Once a classification has been determined, based on the subset, the system presents the user with an enquiry for finding out in more detail what kind of camera the user wants. This is achieved by transmitting an enquiry to an output device of the system to be presented to the user (block 1108). The output may comprise natural language output as text on a screen or as audio or may not use natural language. The output may seek a preferred value or value range of the determined classification. For example, the enquiry could ask the user what type of camera they want, or whether they would be interested in an SLR camera, a compact camera, a camera phone or a kids' camera. This question seeks a preferred value (i.e. SLR camera, compact camera, camera phone or kids' camera) of the classification of camera type. The natural language of the enquiry may be output in the form of synthesized speech, for example using a telephone system, or text, for example in an online chatbot.

Accordingly, and with reference to FIG. 1, the disclosure presents a system for determining an item of interest to a user using natural language dialogue. The system comprises a user input receiving device 102, an output device 104, a database 106 comprising an inventory of items, and a processor 108. The processor 108 is configured to receive from the user input receiving device a user input (block 1102). The user input may comprise one or more words in the case of a natural language user input or may comprise one or more IDs where the user input is by way of buttons rather than a natural language user input. The processor 108 is further configured to identify a subset of the inventory based on the user input (block 1104), process the subset of items to determine a classification for distinguishing between items of the subset (block 1106), and generate and transmit to the output device an enquiry to the user (block 1108). The user input and/or the enquiry may comprise natural language and the enquiry uses the classification, e.g. it references a plurality of different values, value ranges or classes of the classification and these may be presented as a plurality of different options to the user.

The information retrieval method described herein is an iterative method (as indicated by the dotted line from block 1108 to block 1102 in FIG. 11) such that the subset which is identified (in block 1104) in one iteration comprises fewer items than the identified subset from the previous iteration.

Within the system, and in particular within the database 106, a graph-like data structure may be used to map between data points (i.e. items in the system), their attributes and other items. Such a data structure may be used to enable similar or related items to be linked (e.g. accessories for an item may be linked to the item in the data structure).

The user may respond to the enquiry. For example, this may involve selecting a value of a classification, such as the value SLR camera of the classification camera type. In another example, the user may select a particular value in the classification of camera brand. This further narrows down the subset, creating a further subset of items, for example all the SLR cameras, or all the cameras of the selected brand. The system may at this point repeat the iteration on the smaller subset to continue to narrow down what the user is interested in, with the ultimate aim of identifying a particular item that the user is seeking. To repeat the iteration, the further subset is processed to determine a classification that can be used for effectively distinguishing between the items of the further subset. For example, price may be a useful classification for distinguishing between the SLR cameras. In this case, the system may output a further enquiry to the user based on the further classification of price. Colour may also be a good classification for splitting the further subset of SLR cameras, but the user may find it difficult to choose between colours as this classification may not be so important to the user. If this is the case, the system is more likely to present an enquiry to the user using the classification of price than the classification of colour. The enquiry may be presented in natural language, for example as a question, and may be delivered, for example, in the form of synthesized speech or text.

Accordingly, the processor of the system may be configured to receive from the user input device a user response to the enquiry (block 1102), identify a further subset of the inventory based on the user response (block 1104), process the further subset of items to determine a further classification for distinguishing between items of the further subset (block 1106), and generate and transmit to the output device a further enquiry to the user using the further classification (block 1108). The further enquiry may reference a plurality of different values, value ranges or classes of the further classification and these may be presented within the further enquiry as different options for selection by the user.

In order to determine a classification (in block 1106), the processor may be configured to analyse a plurality of candidate classifications based on an ability of the candidate classification to split up the subset of items, or based on an ability of the further classification to enable the user to select a preferred value or range of values of the further classification, or both. Various methods of assessing candidate classifications are described below and in various examples, a score based on the ability of the candidate classification to split up the subset of items may be calculated for each candidate classification (e.g. with a higher score indicating that the classification splits the subset into more even sized parts).

Figure 2:
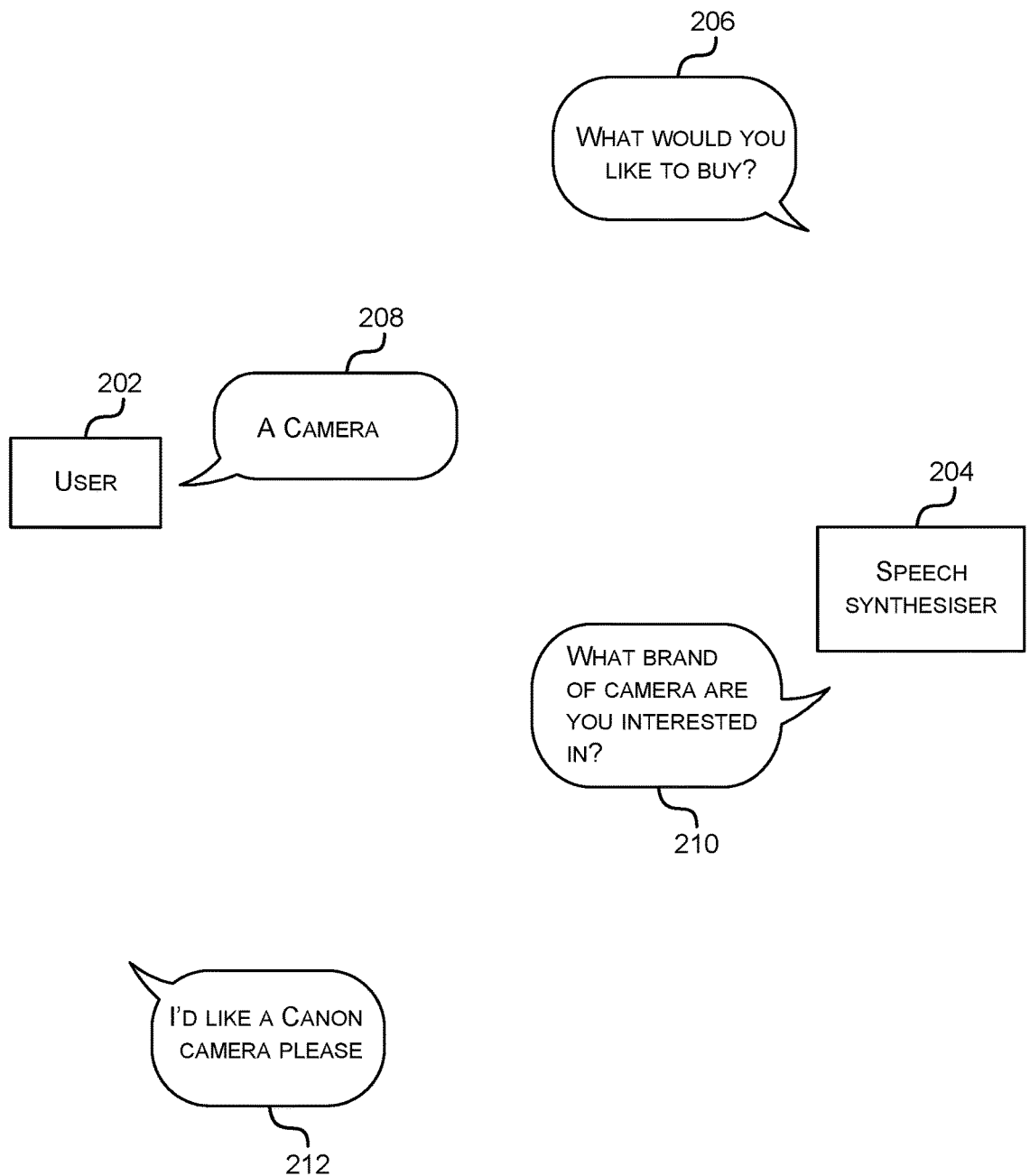
FIG. 2 is a schematic diagram of a speech dialogue with natural language enquiries to a user and natural language user inputs for indicating items of interest.

For example, with reference to FIG. 2, a dialogue between the system and a user 202 may take place with user inputs comprising speech and enquiries from the system comprising synthesized speech. The output device 104 of the system may comprise a speech synthesizer 204 and the process may be initiated by an initial question 206 outputted by the speech synthesizer 204. In this example, the initial question 206 asks the user 202 'What would you like to buy?'. The user 202 replies by uttering a user input 208 comprising one or more words. In this example, the user input 208 is 'A camera.' This provides the first piece of information that the system can use to start finding items of interest to the user. The system identifies a subset of items based on the user input 208, in this example all the cameras. The system determines that the classification of camera brand is suitable for distinguishing between the cameras, and outputs an enquiry 210 using the classification of brand. In this example, the enquiry 210 is 'What brand of camera are you interested in?' The user replies with a user response 212 to the enquiry 210. In this case the user response 212 selects a value of the classification of camera brand by saying 'I'd like a camera of brand X please.' The dialogue may then continue with the system finding a further classification for distinguishing between the items of the further subset of cameras of brand X.

Figure 3:
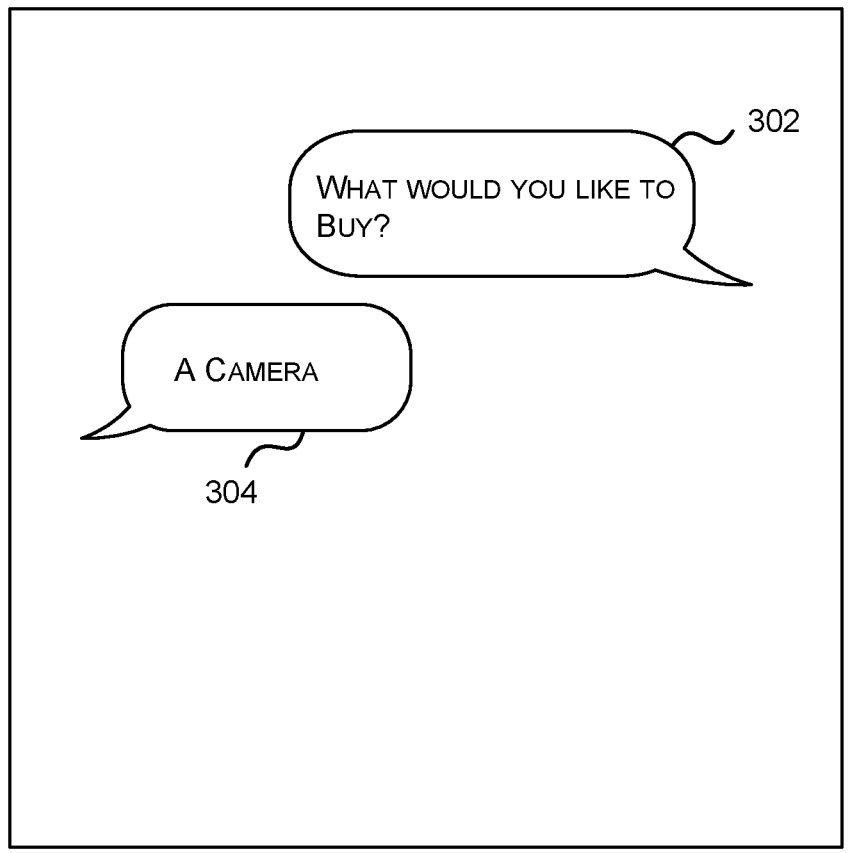
FIGS. 3-4 are a series of a schematic diagrams of a text dialogue with natural language enquiries to a user and natural language user inputs for indicating items of interest.
Figure 4:
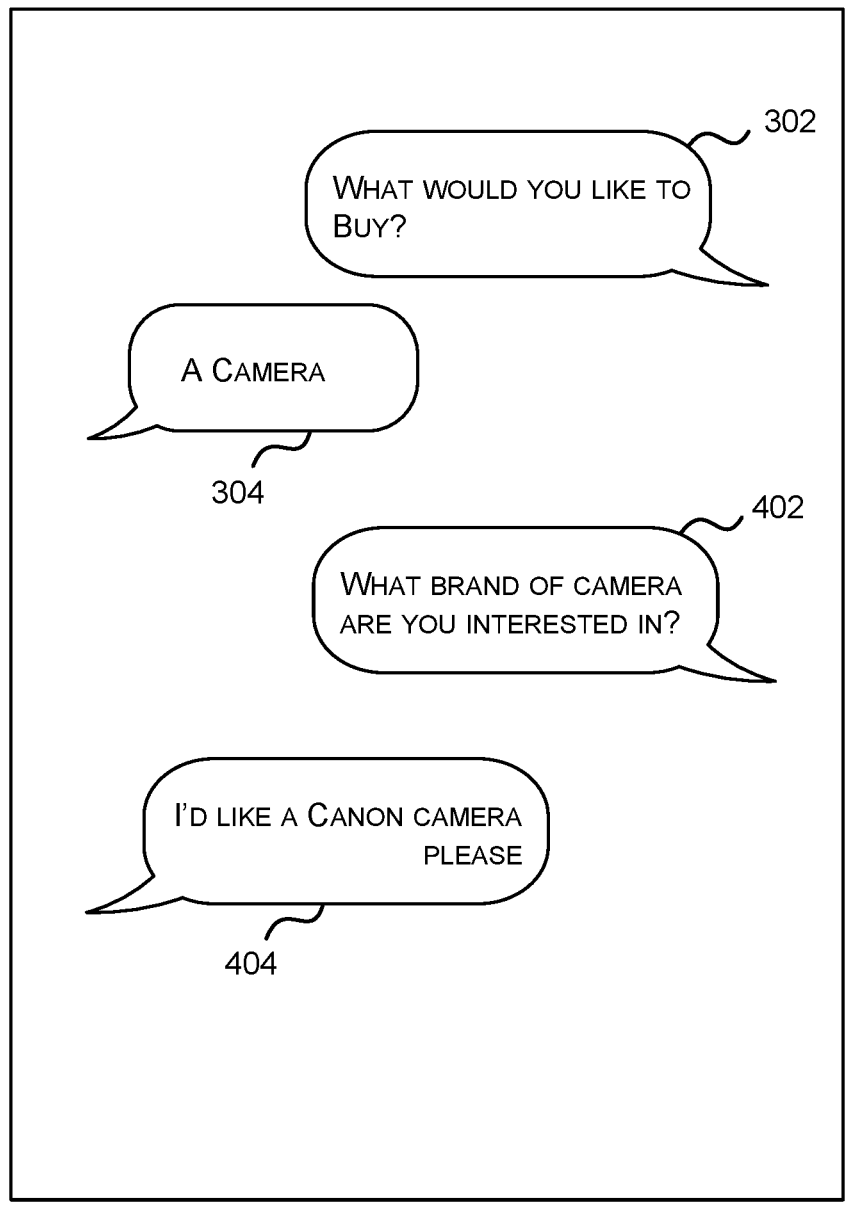

In another example, the dialogue may take place in a chatbot with text instead of speech. As shown in FIG. 3, the system starts the process with an initial question 302 asking the user 'What would you like to buy?' In response, the user provides the user input 304 'A camera.' As shown in FIG. 4, the system searches the inventory for all the cameras and analyses this subset of the inventory to find a classification suitable for distinguishing between the cameras. The classification of brand is identified as being suitable, and the system presents to the user an enquiry 402 'What brand of camera are you interested in?' The user replies with a user response 404 identifying the brand they prefer: 'I'd like a camera of brand X please'.

Figure 5:
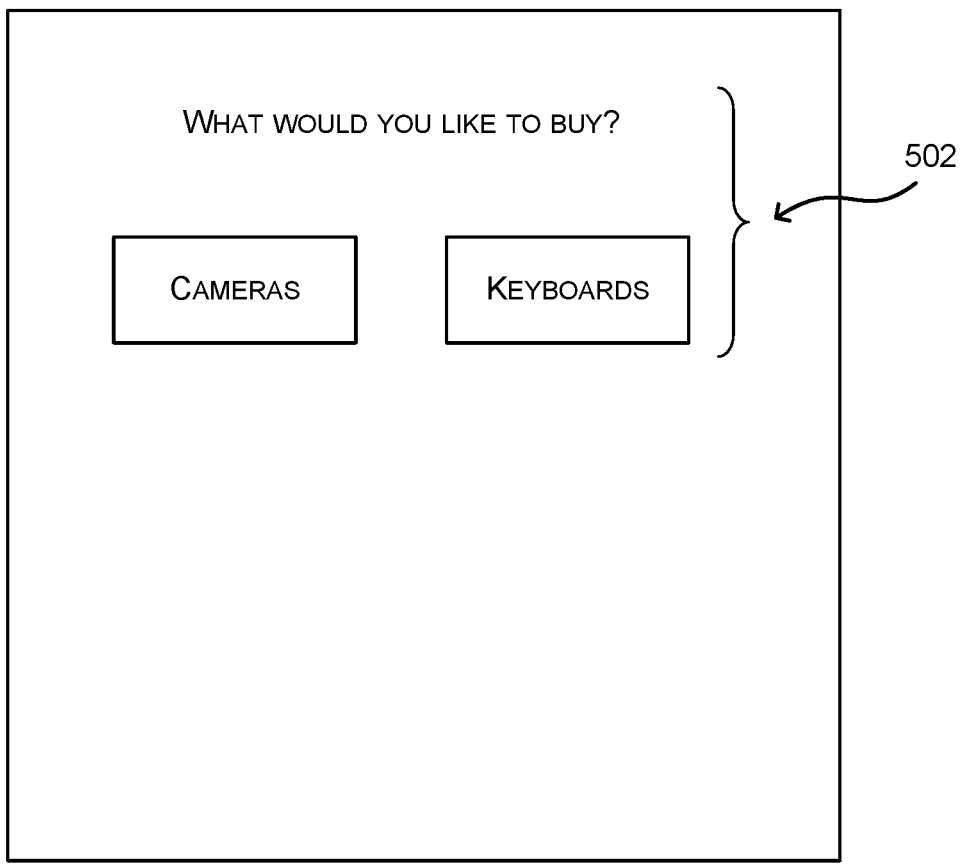
FIGS. 5-8 are a series of schematic diagrams of a dialogue with natural language enquiries to a user and mouse click user inputs for indicating items of interest.

In another example, a dialogue may take place in a chatbot or other interactive graphical user interface with buttons provided to the user for selecting classification values. Referring to FIG. 5, the system starts by presenting to the user an initial question 502 that includes buttons for enabling the user to select a preferred option. In this example, the initial question 502 is 'What would you like to buy?' and the option buttons which may be selected, for example by mouse click input or other user input such as voice command, are 'Cameras' and 'Keyboards'.

Figure 6:
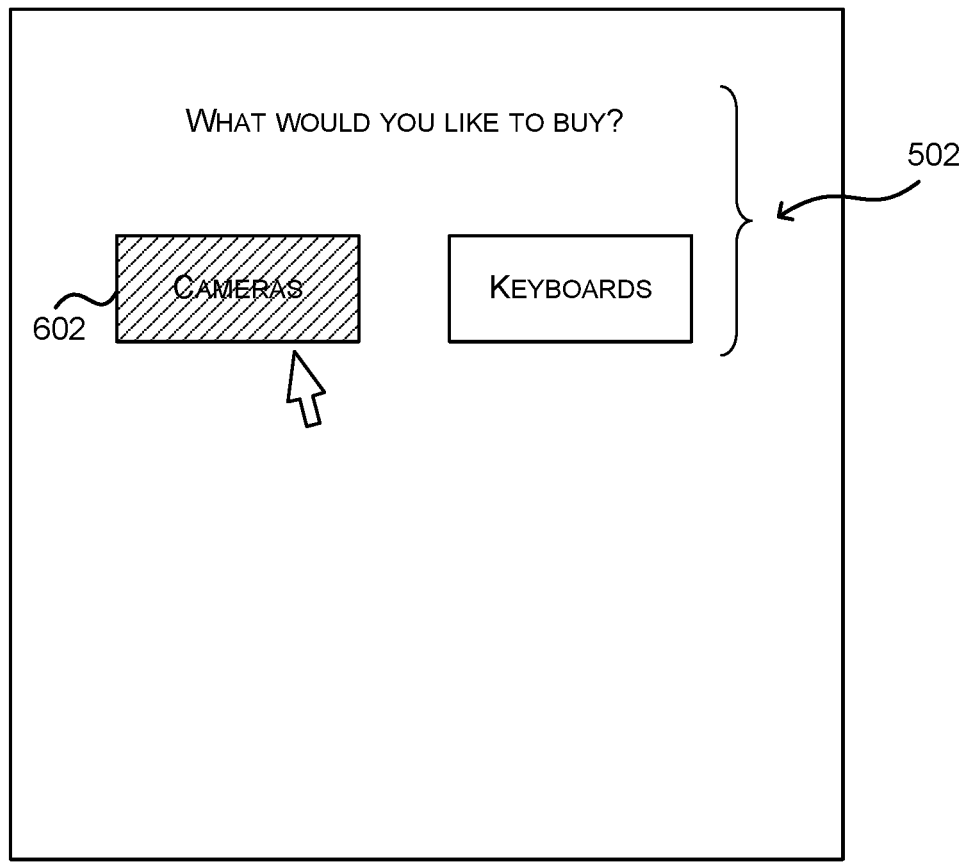

As shown in FIG. 6, the user has selected the 'Cameras' button, in this example by mouse click, to indicate a preference for cameras. The selected button 602 may be highlighted, for example by changing its colour, as shown in FIG. 6.

Figure 7:
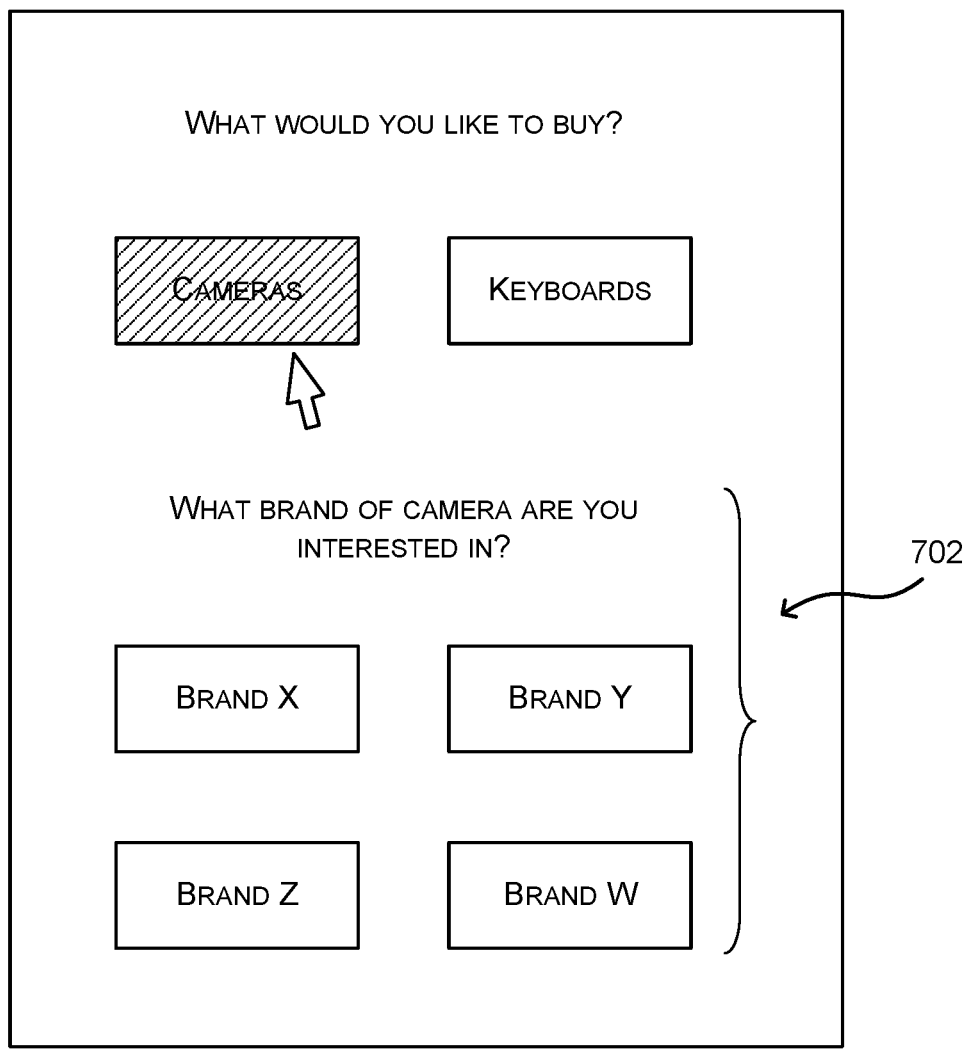
Figure 8:
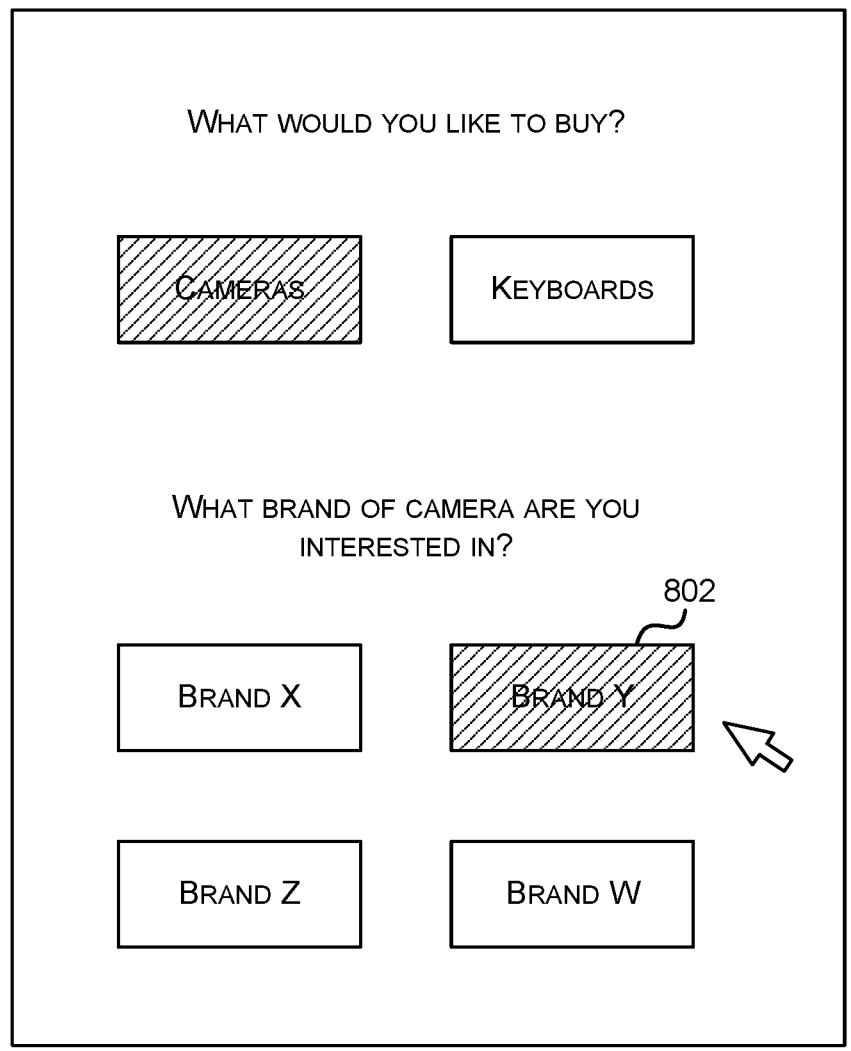

Referring to FIG. 7, the system presents to the user an enquiry 702 of 'What brand of camera are you interested in?' including option buttons for one or more different brands. These buttons are selectable by the user to indicate a user preference for a selected brand. The user may select one of the brands, for example by mouse click input as shown in FIG. 8. The selected button 802 may be highlighted to show it has been selected.

Figure 9:
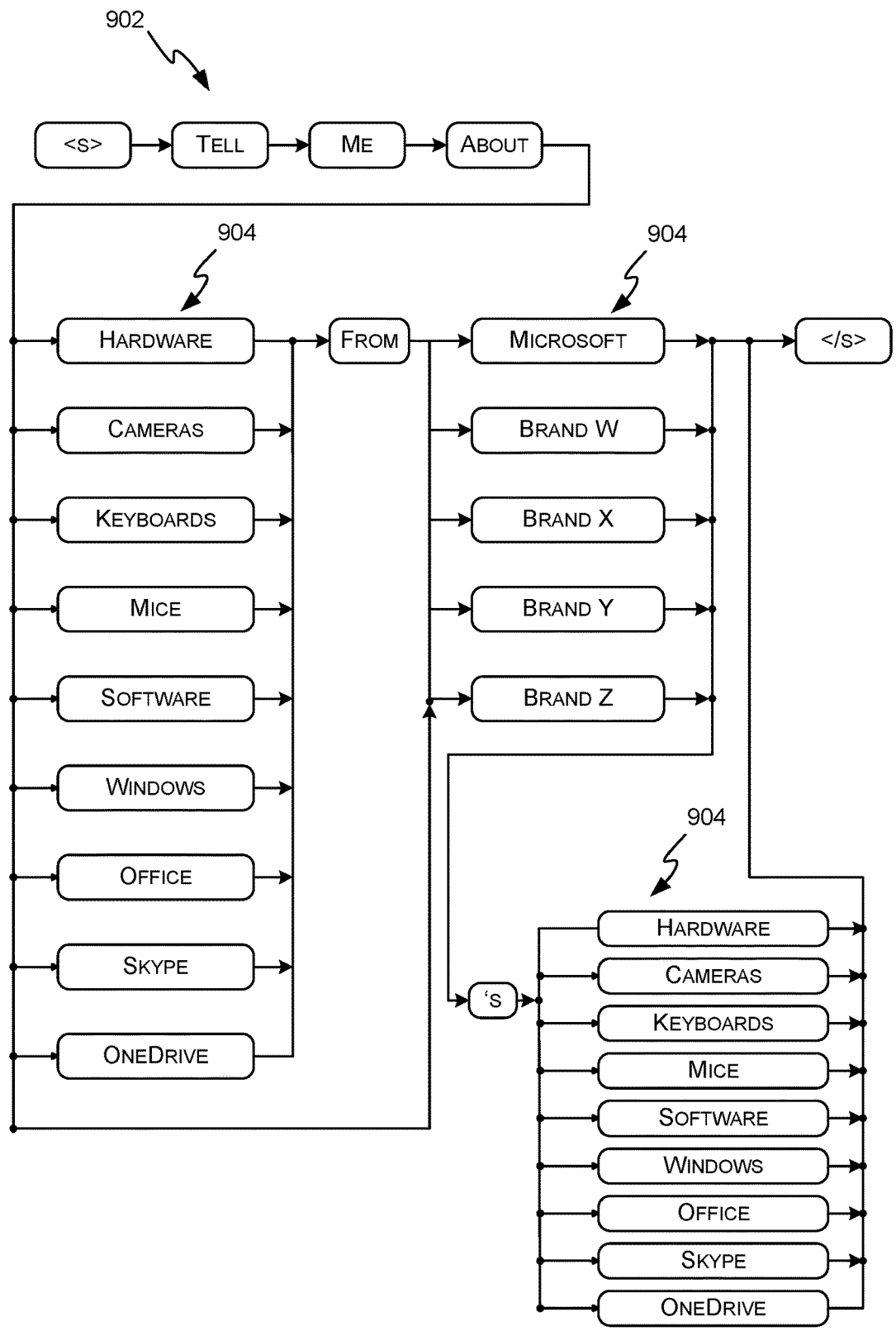
FIG. 9 is a schematic diagram of an example speech grammar for interpreting natural language user input.

Natural language inputs from the user (received in block 1102), such as user inputs 208 and 304 and user responses 212 and 404, may be interpreted by the system using a speech grammar or voice dialogue specification and/or the user inputs and user responses may be replaced, in full or in part, by the usage of placeholders with data from an inventory. Examples of speech grammar or voice dialogue specifications include but are not limited to Speech Recognition Grammar Specification, VoiceXML, and Microsoft Language Understanding Intelligent Service Dialogs. The speech grammar comprises a structure such as the structure 902 shown in FIG. 9 that includes predefined parts of a phrase or sentence that can be combined with data from an inventory. For example, if the system is interacting with a user in relation to an inventory of hardware or programs for sale, then inventory data 904 such as classifications, classification values, properties and other labels of items may be inserted into certain parts of the structure 902 to generate a natural language phrase or sentence that the system is configured to recognize if it is uttered or typed in by the user. The system will then not only be able to recognize the phrase or sentence, but it will be able to identify which items of the inventory the user is referring to. For example, using the words 'keyboards' and 'Microsoft' from the inventory data, the sentence 'Tell me about keyboards from Microsoft' can be recognized. Using the same structure 902, the sentences 'Tell be about Brand X' and 'Tell me about mice of Brand Y' can be recognized.

In examples where user inputs and user responses are replaced, in full or in part, by the usage of placeholders with data from an inventory, each placeholder allows for a name or value of an attribute in the database or an attribute name or attribute value that is recursively referenced by an attribute in the database. For example, "Create a meeting on Adam's calendar" can be represented by "Create a {item.Type-value} on {Person with Name→Calendar reference}". The system then understands to look up the calendar for the specified person Adam and create an object of type meeting. In another, recursive example: "Show me jewelry for Adam's sister's dog Max" can be represented by "Show me {object.type==jewelry} for {Person==Adam→Only Sister Sibling→Dog.Name==Max". The system would understand that the user asked for Adam's sister. In case there are more than one, it could optionally follow up to ask which one is specified.

Other speech grammar structures can be used to recognize other phrases or sentences, including ones with relational terms such as more, less, larger than, and smaller than. To enable the system to interpret relational terms, a table 1002 of relation operators may be constructed, for example based on relational terms that are relevant for a particular inventory or subset of an inventory. For example, the user may ask for a bigger or smaller camera, but it is not necessarily apparent to a computer what classification or attribute these terms relate to. It may therefore be useful to include the terms bigger and smaller in the table 1002 and to associate each one with the classification of size, together with an indication of which term is associated with a larger size and which is associated with a smaller size, as shown in FIG. 10. Other relational operators are also included to enable the system to convert spoken or otherwise inputted phrases or terms such as thinner, quieter, cheaper with their meaning. Relational operators may be defined specific to certain item types. For example, better in the context of cameras might be interpreted to mean more megapixels, while better in the context of keyboards would be interpreted differently.

It is to be appreciated that elements of the speech grammar may be generated dynamically, for example when a new subset is identified, so that inventory data 904 relating to a particular subset, such as small cameras of a particular brand, can be inputted into one or more speech grammar structures. The speech grammar may be constructed to include structures that enable a large range of possible sentences to be recognized. For example, these might include 'Tell me about more lightweight cameras'; 'Are there more expensive ones?'; Are there colours other than grey?'

User preferences may also be incorporated into the determination of which classification may be used to make enquiries with the user. For example, if it is known from previous interaction with a user, such as a previous dialogue, that aesthetics are important to the user, then the classification of colour may be suitable for distinguishing between cameras. Information relating to the user's preferences or previous behaviour may be stored in a user profile in a database accessible by the system or forming part of the system.

The following two example files, in VoiceXML and SRGS, show how a grammar for specifying an item may be written and which may be used in combination with the methods described herein. The VoiceXML file specifies the dialog where the system asks "What product are you interested in?" and then listens for words uttered by the user as defined in the SRGS file. The example below implies the SRGS be saved as a file called "product.gram" in the folder "grammars" relative to the location of the VoiceXML file. Where indicated, the possible options (and in various examples, the entire grammar) may be auto generated using the methods described herein (e.g. using the method of FIG. 11). In an example where the inventory is in the form of a graph, the system may traverse the graph and add grammar and dialogs for a subset of all possible combinations. When generating the grammar from the inventory, a set of verbs and/or filler words may optionally be used.

VoiceXML example file:

```
<!-- http://www.voicexml.org/ -->
<?xml version="1.0"?>
<vxml version="2.0">
    <form id="techproducts">
        <field name="product">
            <prompt>What product are you interested in?</prompt>
            <grammar src="grammars/product.gram" type="application/srgs+xml" />
            <help>You can say "Show me [insert auto generated options from the method of FIG. 11]" or "Show me keyboards from [insert auto generated options from the method of FIG. 11]".</help>
        </field>
    </form>
</vxml>
```

SRGS example file:
```
<!-- https://msdn.microsoft.com/en-us/library/office/hh361653(v=office.14).aspx -- >
<grammar version="1.0" xml:lang="en-US" root="rootRule"
xmlns="http://www.w3.org/2001/06/grammar">
    <rule id="rootRule">
        <one-of>
            <ruleref id="#showMeManufacturersProduct" />
            <ruleref id="#showMeProductFromManufacturer" />
        </one-of>
    </rule>
    <rule id="showMeManufacturersProduct">
        <one-of>
            <item repeat="0-1"> Show me </item>
```

-continued

```
        <item repeat="0-1"> I would like to know more about </item>
        <item repeat="0-1"> I would like to buy </item>
        <item repeat="0-1"> Tell me about </item>
      </one-of>
      <ruleref id="#manufacturersProduct" />
    </rule>
    <rule id="manufacturersProduct">
      <ruleref id="#manufacturers" />
      <item repeat="0-1"> 's </item>
      <ruleref id="#products" />
    </rule>
    <rule id="showMeProductFromManufacturer">
      <one-of>
        <item repeat="0-1"> Show me </item>
        <item repeat="0-1"> I would like to know more about </item>
        <item repeat="0-1"> I would like to buy </item>
        <item repeat="0-1"> Tell me about </item>
      </one-of>
      <ruleref id="#productFromManufacturer" />
    </rule>
    <rule id="productFromManufacturer">
      <ruleref uri="#products" />
      <item repeat="0-1"> 's </item>
      <one-of>
        [insert auto generated options from the method of FIG. 11]
      </one-of>
      <ruleref uri="#manufactures">
    </rule>
    <rule id="products">
      <one-of>
        [insert auto generated options from the method of FIG. 11]
      </one-of>
    </rule>
    <rule id="manufactures">
      <one-of>
        [insert auto generated options from the method of FIG. 11]
      </one-of>
    </rule>
</grammar>
```

It will be appreciated that the order in which classifications are used in enquiries to determine what the user is interested in may affect the efficiency with which an item of interest to the user can be determined, i.e. the efficiency of the information retrieval method. For example, in the above example of classifications of cameras, the following classifications in the following order may be used.

Colour, price, camera type

However, it may be found that for most users camera type has a greater influence on finding a suitable camera than colour or price. For example, it may be that even if cameras with suitable colours and prices are presented to the user, if they are all the wrong type of camera the user will not buy. In this case, it may be more likely to lead to a successful outcome such as a sale if camera type is used to filter the items earlier in the process. In this case, a series of enquiries using classifications in the following order may lead to more sales and a more efficient and effective determination of cameras of interest to the user.

Camera Type, Colour, Price

In general, classifications that are more important to the user may be presented earlier in the process. In some examples, this may be expressed by saying that enquiries to the user using classifications having a better ability to lead to a sale may be used first. In other examples, the results may be re-ranked based on other priorities, for example, showing classifications that help the user find the drug trial report with the least side effects (i.e. sorting by a property that denotes a numeric scale for drug side effects).

As described above, other ways of assessing the suitability of a classification and how early it may be used include the ability of a classification to split up a set of items. For example, if there are one hundred cameras and only two are waterproof, then being waterproof is a sparse property and the classification of whether the camera is waterproof does not split the set of cameras well. In this case, being waterproof is not a high performing classification for determining which cameras are of interest to the user. A diverse and reasonably evenly distributed classification is preferred which splits the items into a reasonable number of comparably sized groups.

Another factor to consider is that some classifications may not support easy decision-making for the user between values of the classification. For example, it may be more difficult for the user to choose between camera colours than between camera price. In this case, price is a more effective classification and may be used before colours. For cameras, the classification of price can be said to enable the user to direct the search more easily than the classification of colours.

In the methods described herein, the classification may be identified (in block 1106) as described in the examples below.

Each classification may be scored based on a set of performance criteria, such as:
  Ability to split up the set of products
  Ability to enable the user to direct the search
  Ability to lead to a sale These may be combined to give an overall score for each classification, and the classification with the overall score indicating best performance can be used first. The classifications may then be used in the order of their overall scores thereafter in the process of determining items of interest.

It would also be suitable for the user to be provided with input device such as buttons, drop down menus or voice commands for manually selecting the classifications by which to search. In this case, it may be suitable to determine the user's favourite classifications and/or classification orders and to automatically bias towards using these classifications and classification orders in future searches.

In various examples, when a classification (such as colour or price) has been chosen for presenting options to the user, it has also to be determined which values, value ranges or classes of that classification may be presented to the user within the output enquiry. For example, if the classification of colour is to be used first in a search for cameras, the question becomes which colour options to present to the user in the output enquiry. If four values of colour are to be presented in the output enquiry, may these be black, cream, blue and grey, or black, silver, grey and white, or another combination? In order to select the values of colour, or the values, value ranges or classes of any classification, one or more of the following performance criteria may be considered.
  Popularity among users
  Most common in inventory or subset of inventory
  Include one wildcard (e.g. to show a value of a different classification)
  Bias towards user's known preferences
  Ability to enable the user to direct the search
  Ability to lead to a sale The skilled person will appreciate that there are various ways to define or measure some of the performance criteria. For example, the ability of a classification, value or value range to enable the user to direct the search can be measured by tracking user confusion or delays in user choice, for example based on speech indicators, such as 'ummmm' or long pauses or failure to answer after the question is repeated, or other inputs such as eye tracking. If a user struggles to make a choice (e.g. as determined by speech indicators, as described above) or indicates interest in three out of four options, this indicates that the classification or values are not enabling the user to choose well. If a user cannot choose, a back function may be provided triggered by a gesture such as a voice command of 'I can't choose' to instruct the system to abandon a set of values or value ranges or a classification, and attempt to provide the user with a different set of options. Alternatively, the back function may be triggered automatically in response to detecting that a user cannot choose. In various examples, a back function may be triggered where, instead of selecting one of the new classification values, the user instead selects a totally different classification (e.g. if a user is presented with a series of colour options and responds by saying "I want a camera with a long battery life"). In various examples, prior to triggering the back function, the system may provide additional choices or information to the user (e.g. by listing the available options or asking the user if they would prefer to select by an alternative classification).

Furthermore, the ability of a classification, class, value or value range to lead to a sale or to enable the user to direct the search can be individualised to a user, based on global trends among all users, or both. Popularity among users may, for example, be inferred from information in social media networks.

Values may be discrete or continuous. For example, discrete values for a size classification may include small, medium and large and these may alternatively be considered to be classes. Continuous values for a clothing size classification may include ranges of waist sizes in centimeters or inches. Colour can be treated as text labels such as blue and red, or as continuous red-green-blue (RGB) values. Alternatively, colour options may be grouped in other ways, such as three categories of black, white and colourful. There may also be other textual classifications such as jacket type that may take values such as winter jacket, summer jacket, sports jacket and so on.

In some examples, the classification, value or value ranges may be selected randomly or may be instructed by the user by voice or other command or gesture. They may also be selected based on popularity by virtue of having been frequently selected by users in previous searches. Other selection criteria may also apply such as the ability to lead to the best profit margin. For example, if it is known that a competitor is selling a large volume of a particular item, then it may be suitable to bias towards the selection of values, value ranges or instances of items that are similar. Other influencers that may be used to contribute to the selection criteria may include seasonality, excess of stock, sales pricing, and the presence and nature of merchandizing deals.

The positioning of classification values when presented to a user may also be affected by characteristics of the values. For example, if the classification is the brand, then, depending on the implementation, more popular brands may be listed earlier by a speech synthesizer or displayed first or in a premium position in a set of selectable buttons. Entities in the supply chain such as manufacturers or brands may also pay for placement of their products in certain positions. In some circumstances, it may be suitable to select the ordering of the options randomly.

As well as detecting user interest in certain items or classification values, negative user inputs indicating dislike or a lack of interest may also be detected. For example, an absence of interest or a voice command saying "I don't like blue" may be detected and used as negative inputs. Based on these, the characteristics that are not liked or not of interest may be excluded from being presented to the user. This helps to further narrow down what the user may be interested in.

Multi-selection may also be supported, for example to determine multiple colours that the user may be interested in, or multiple combinations of characteristics. For example, it may be determined based on user input that a user likes blue or white jackets that are ideally inexpensive but otherwise quite expensive but not very expensive. Other combinations are detectable, such as a user that shows an interest in white expensive jackets or blue inexpensive jackets.

Pinning may optionally be supported in which a user may pin an object to a set of objects that can be recalled in response to a request by the user (e.g. by saying 'tell me about my pinned items' at any time) or recalled automatically once it is detected that the user is indecisive (e.g. as determined based on one of the speech indicated described above). A user may pin an object by instructing the system to add the object to the set until it is unpinned, regardless of future selections of (i.e. expressions of interest in) other objects. The user may instruct the display system to pin an object using various input devices. For example, the user may use a voice command such as 'pin this' or 'remember this for later' spoken during or just after the system details the object to the user. In other examples, the user may use a voice command such as 'pin the watch with the black strap' or 'unpin the watch with the number markings'. In the context of a chatbot, there may be a button that allows pinning and unpinning.

A user profile may be built by observing and recording user behaviour and/or by building a profile of characteristics of the user such as gender, age, and location. User information may be mined from social media and other accounts of the user, providing that the user's permission to do so has been obtained. The user permission may, for example, be obtained using an opt-in/opt-out voice command.

User behaviour such as browsing behaviour and purchasing behaviour may be used to build a profile of items and product characteristics that the user has expressed an interest in. Scores or weights representing a level of user interest can be assigned and stored in a user profile as follows. In the following example 0.1 indicates a low level of interest and 1.0 represents a maximum level of interest.

Example

| | |
|---|---|
| Jacket-0.9-colour-blue-0.8-slevelength-long-0.8 | product of scores is 0.576 |
| Jacket-0.9-colour-blue-0.8-slevelength-medium-0.4 | product of scores is 0.288 |
| Jacket-0.9-colour-grey-0.6-slevelength-long-0.8 | product of scores is 0.432 |

This example represents a user who is highly interest in jackets, particularly blue jackets, preferably having long sleeves. Each item and its scores, for example the blue, long-sleeved jacket and its scores, represent a data point in the user profile. An overall score for each data point may be calculated, for example by finding the product of the individual scores.

The system may optionally store a time sequence in which the user showed interest in data points. For example, the above interest in jackets may be recorded as occurring in June, while in July the same user expresses an interest in trousers.

June-jacket-0.9-colour-blue-0.8-sleevelength-long-0.8
June-jacket-0.9-colour-blue-0.8-sleevelength-medium-0.4
June-jacket-0.9-colour-grey-0.6-sleevelength-long-0.8
July-trousers-0.8

This enables the system to recognise that in July trousers that are blue or grey, or that match or coordinate with blue or grey, may be presented to the user before trying other colours. In this way the system assumes that there is a preference for blue, grey or colours that coordinate with blue or grey, whilst still allowing users to choose other colours. In the chatbot implementation described above, an image of each item may optionally be presented in the chatbot to the user.

More general user preferences may also be stored in the user profile. For example, if a user prefers clothes in a particular price bracket, then there may be a bias towards presenting clothes in that price bracket to the user.

The system can be used not only to determine items of a particular type, such as jackets, that are of interest to a user, but also to determine different types of products that are suitable for being merchandised in conjunction with the jackets. For example, if it is determined that the user is interested in blue jackets, it may be appropriate to additionally present coordinating sports gear and accessories or coordinating trousers.

The interface may be configured for use by a merchandising buyer. If the merchandising buyer is interested in a particular jacket, then the jacket can be given a score boost of 0.2 in the merchandising buyer's profile, for example up to a maximum score of 1.0.

In other examples, the interface may be configured such that a salesperson may register their own selling preferences with the system, so that the choice of objects, as well as the choice of which categories are explored before others, may be influenced by what the seller is best able to sell. This may be suitable if, for example, the salesperson is a specialist in a particular range of products. In this way, the display system may take into account not only the customer's behaviour and the customer's profile, but also the salesperson's preferences and expertise.

The starting point of a search, such as a search for T-shirts, jackets or trousers, can be established from the context of a search using cookies from the user's previous or recent browsing history and/or using voiceprint recognition (e.g. for a speech-based scenario) and/or using a telephone number-based database or chat username-based database. For example, if the user has recently completed a search on a department store's website or telephone service for trousers, then the starting point in a chatbot or other implementation could be a selection from a range of differently coloured trousers.

The starting point may additionally or alternatively be influenced by a set of suggestions based on a user profile, an average profile of users (i.e. global trends), or a set of statically defined data points. Other influencers may comprise for example what sells well and user location (e.g. only search among contents of a nearby warehouse).

In further examples, the method may enable a user to query about related items to the item currently talked about, like "Tell me about accessories for this item in the same color". In such an example, the speech grammar may have the form:

"Show me {attribute-name, like accessories} for this item", "Show me {attribute-name} {optional: for this item} in the same {attribute-name, like color, size, . . . }.

In various examples the system may automatically translate data points/items, their attributes and speech grammar into different languages to support users in multiple regions, e.g. using a third party translation service like Microsoft Bing Translator.

In various examples the system may provide a full text search and provide all items/data point whose attributes match the search query.

In various examples the system may allow users to say "Classify by {attribute-name}" returning a list of classifiers. For example, in response to "Classify by color" the current subset is divided by colors.

In various examples the system may allow a user to say "List all items" and in response may return a list of the items in the current subset (i.e. as identified in the most recent iteration of block 1104).

In various examples the system may allow a user to say "Tell me about the items I was interested in last" when returning to the system. To enable this, the system may store (e.g. in the database 106) the most recently identified subset (i.e. as identified in the most recent iteration of block 1104).

Figure 12:
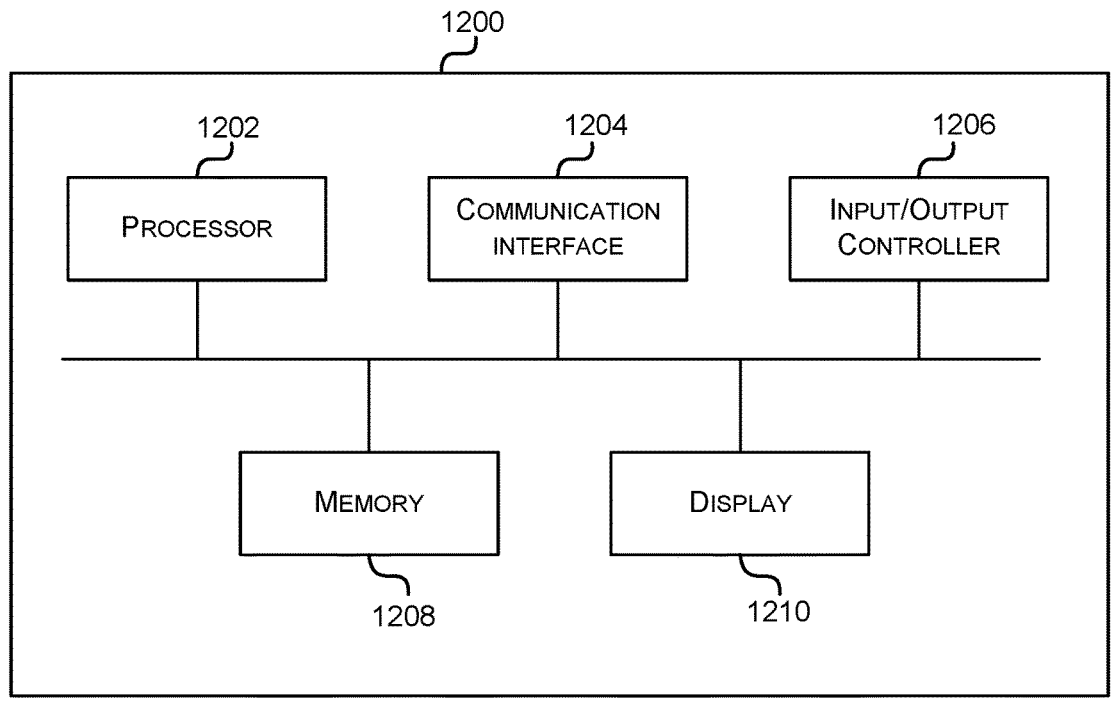
FIG. 12 is a schematic diagram of an exemplary computing device in which the method of FIG. 11 may be implemented.

A computing device 1200 suitable for implementing the method 1100 is shown in FIG. 12. The computing device 1200 comprises a processor 1202, a communication interface 1204, an input/output controller 1206, computer memory 1208, and a display 1210.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Computer executable instructions are provided using any computer-readable media that is accessible by a computing based device such as computing device 1100. Computer-readable media includes, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium may not be interpreted to be a propagating signal per se. Although the computer storage media (memory) is shown within the computing-based device it will be appreciated that the storage is, in some examples, distributed or located remotely and accessed via a network or other communication link (e.g. using communication interface).

The computing-based device also comprises an input/output controller arranged to output display information to a display device which may be separate from or integral to the computing-based device. The display information may provide a graphical user interface. The input/output controller is also arranged to receive and process input from one or more devices, such as a user input device (e.g. a mouse, keyboard, camera, microphone or other sensor). In some examples the user input device detects voice input, user gestures or other user actions and provides a natural user interface (NUI). In an embodiment the display device also acts as the user input device if it is a touch sensitive display device. The input/output controller outputs data to devices other than the display device in some examples, e.g. a locally connected printing device.

Any of the input/output controller, display device and the user input device may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

A first further example provides an information retrieval system using natural language dialogue, the system comprising: a user input receiving device; an output device; a database comprising an inventory of items; and a processor configured to retrieve one or more items from the inventory of items by: in response to receiving from the user input receiving device a user input; identify a subset of the inventory based on the user input; automatically process the subset of items to determine a classification for distinguishing between items of the subset; generate an enquiry for a user, wherein the enquiry comprises a plurality of different values, value ranges or classes of the classification; and transmit the enquiry to the output device, wherein at least one of the user input and the enquiry comprises natural language.

The first further example may additionally comprise any combination of one or more of the following aspects:
both the user input and the enquiry for the user may comprise natural language.
the user input may comprise natural language and the processor may be configured to interpret the user input using a speech grammar and/or framework.
the processor may be configured to generate the speech grammar using the inventory or the subset of the inventory.
the user input may comprise natural language and the processor may be configured to interpret the user input using a table of relation operators.
the user input may comprise speech.
the user input may comprise text and the processor may be configured to interpret the user input using a chatbot framework.
the enquiry may comprise synthesised speech.
the enquiry may comprise text.
the enquiry may be constructed to prompt the user to indicate a preferred value or range of values of the classification from the user.
the processor may be configured to determine the classification based on an ability of the classification to split up the subset of items.
the processor may be configured to determine the classification based on an ability of the classification to enable the user to select a preferred value or range of values of the classification.
the processor may be further configured to: receive from the user input device a user response to the enquiry; identify a further subset of the inventory based on the user response; process the further subset of items to determine a further classification for distinguishing between items of the further subset; generate a further enquiry for the user, wherein the further enquiry comprises a plurality of different values, value ranges or classes of the further classification; and transmit the further enquiry to the output device.
the user response may comprise natural language and the processor may be configured to interpret the user response using a speech grammar.
the processor may be configured to generate the speech grammar using the inventory or the subset of the inventory.
the processor may be configured to interpret the user input/response using a table of relation operators.
the processor may be configured to determine the further classification based on an ability of the further classification to split up the further subset of items.
the processor may be configured to determine the further classification based on an ability of the further classification to enable the user to select a preferred value or range of values of the further classification.

A second further example provides a method of information retrieval using natural language dialogue, the method comprising: receiving from a user input receiving device a user input; identifying a subset of an inventory of items based on the user input; automatically processing the subset of items to determine a classification for distinguishing between items of the subset; generating an enquiry for a user, wherein the enquiry comprises a plurality of different values, value ranges or classes of the classification; and transmitting the enquiry to an output device, wherein at least one of the user input and the enquiry comprises natural language.

A third further example provides an information retrieval device using natural language dialogue, the device providing: a user input receiving device; an output device; a database comprising an inventory of items; and a processor configured to: receive from the user input receiving device a user input; identify a subset of the inventory based on the user input; process the subset of items to determine a classification for distinguishing between items of the subset; generate an enquiry for a user, wherein the enquiry comprises a plurality of different values, value ranges or classes of the classification; and transmit the enquiry to the output device, wherein at least one of the user input and the enquiry comprises natural language.

A fourth further example provides a device for determining an item of interest to a user using natural language dialogue, the device providing: a user input receiving device; an output device; a database comprising an inventory of items; and a processor configured to: receive from the user input receiving device a user input; identify a subset of the inventory based on the user input; process the subset of items to determine a classification for distinguishing between items of the subset; generate an enquiry for a user, wherein the enquiry comprises a plurality of different values, value ranges or classes of the classification; and transmit the enquiry to the output device, wherein at least one of the user input and the enquiry comprises natural language. The processor may be further configured to repeat the identification of a subset based on an additional user input received in response to the generated enquiry, to identify a further smaller subset and then determine a classification for this smaller subset. If the further smaller subset comprises more than one item, a further enquiry may be generated based on the classification of the classification of the smaller subset (e.g. where the enquiry comprises a plurality of different values, value ranges or classes of the classification). The method may be repeated until a single item or a group of items of interest to the user are identified.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code device adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. An information retrieval system using natural language dialogue, the system comprising:
   a user input receiving device;
   an output device;
   a database comprising an inventory of items; and
   a processor configured to retrieve one or more items from the inventory of items by:
      in response to receiving from the user input receiving device a user input;
      identify a subset of the inventory based on the user input;
      automatically process the subset of items to determine a classification for distinguishing between items of the subset;
      generate an enquiry for a user, wherein the enquiry comprises a plurality of different values, value ranges or classes of the classification;
      transmit the enquiry to the output device, wherein at least one of the user input and the enquiry comprises natural language;

receive, from the user input receiving device, a user response to the enquiry;
identify a further subset of the inventory based on the user response;
process the further subset of items to determine a further classification for distinguishing between items of the further subset;
generate a further enquiry for the user, wherein the further enquiry comprises a plurality of different values, value ranges or classes of the further classification; and
transmit the further enquiry to the output device.

2. The system of claim 1, wherein both the user input and the enquiry for the user comprise natural language.

3. The system of claim 1, wherein the user input comprises natural language and wherein the processor is configured to interpret the user input using a speech grammar and/or framework.

4. The system of claim 3, wherein the processor is configured to generate the speech grammar using the inventory or the subset of the inventory.

5. The system of claim 1, wherein the user input comprises natural language and wherein the processor is configured to interpret the user input using a table of relation operators.

6. The system of claim 1, wherein the user input comprises speech.

7. The system of claim 1, wherein the user input comprises text and wherein the processor is configured to interpret the user input using a chatbot framework.

8. The system of claim 1, wherein the enquiry comprises synthesised speech.

9. The system of claim 1, wherein the enquiry comprises text.

10. The system of claim 1, wherein the enquiry is constructed to prompt the user to indicate a preferred value or range of values of the classification from the user.

11. The system of claim 1, wherein the processor is configured to determine the classification based on an ability of the classification to split up the subset of items.

12. The system of claim 1, wherein the processor is configured to determine the classification based on an ability of the classification to enable the user to select a preferred value or range of values of the classification.

13. The system of claim 1, wherein:
the user response comprises natural language; and
the processor is configured to interpret the user response using a speech grammar.

14. The system of claim 13, wherein the processor is configured to generate the speech grammar using the inventory or the subset of the inventory.

15. The system of claim 13, wherein the processor is configured to interpret the user input/response using a table of relation operators.

16. The system of claim 1, wherein the processor is configured to determine the further classification based on an ability of the further classification to split up the further subset of items.

17. The system of claim 1, wherein the processor is configured to determine the further classification based on an ability of the further classification to enable the user to select a preferred value or range of values of the further classification.

18. A method of information retrieval using natural language dialogue, the method comprising:
receiving from a user input receiving device a user input identifying a subset of an inventory of items based on the user input;
automatically processing the subset of items to determine a classification for distinguishing between items of the subset;
generating an enquiry for a user, wherein the enquiry comprises a plurality of different values, value ranges or classes of the classification; and
transmitting the enquiry to an output device,
wherein at least one of the user input and the enquiry comprises natural language;
receiving, from the user input receiving device, a user response to the enquiry;
identifying a further subset of the inventory based on the user response;
processing the further subset of items to determine a further classification for distinguishing between items of the further subset;
generating a further enquiry for the user, wherein the further enquiry comprises a plurality of different values, value ranges or classes of the further classification; and
transmitting the further enquiry to the output device.

19. An information retrieval device using natural language dialogue, the device providing:
a user input receiving device;
an output device;
a database comprising an inventory of items; and
a processor configured to:
receive from the user input receiving device a user input;
identify a subset of the inventory based on the user input;
process the subset of items to determine a classification for distinguishing between items of the subset;
generate an enquiry for a user, wherein the enquiry comprises a plurality of different values, value ranges or classes of the classification; and
transmit the enquiry to the output device,
wherein at least one of the user input and the enquiry comprises natural language;
receive, from the user input receiving device, a user response to the enquiry;
identify a further subset of the inventory based on the user response;
process the further subset of items to determine a further classification for distinguishing between items of the further subset;
generate a further enquiry for the user, wherein the further enquiry comprises a plurality of different values, value ranges or classes of the further classification; and
transmit the further enquiry to the output device.

20. The information retrieval device of claim 19, the database further comprises a graph data structure linking related items in the inventory of items; and
wherein the processor is further configured to identify the subset of the inventory based on the user input by traversing the graph data structure.

* * * * *